July 2, 1929.  T. A. McINTYRE  1,719,274
AUTOMOBILE MECHANISM
Filed June 22, 1928  2 Sheets-Sheet 2
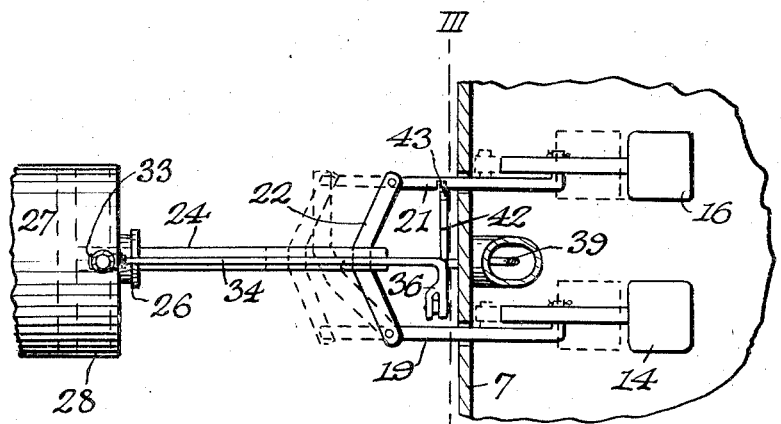
Fig. II.
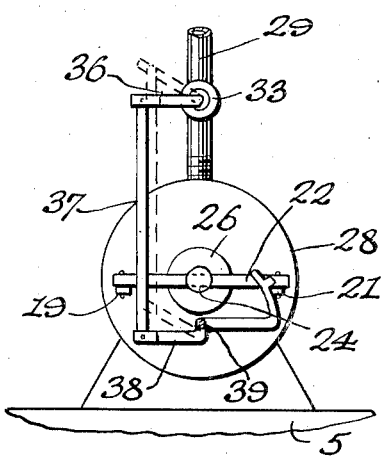
Fig. III.
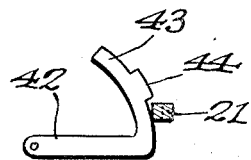
Fig. IV.
INVENTOR.
THOS. A. McINTYRE
BY *Victor J. Evans*
ATTORNEYS.

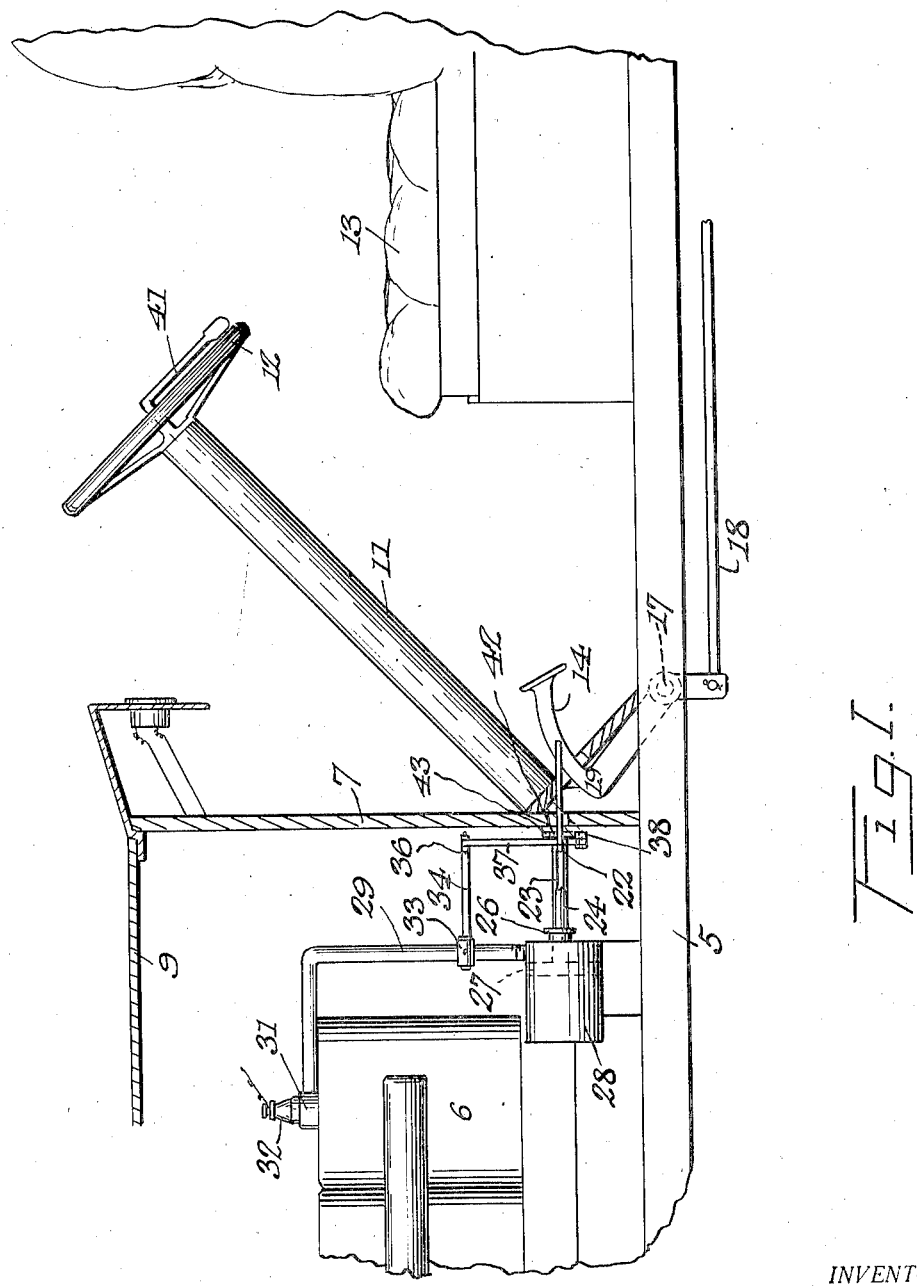

Patented July 2, 1929.

1,719,274

UNITED STATES PATENT OFFICE.

THOMAS A. McINTYRE, OF SAN FRANCISCO, CALIFORNIA.

AUTOMOBILE MECHANISM.

Application filed June 22, 1928. Serial No. 287,593.

This invention relates to improvements in automobile braking means.

The principal object of this invention is to provide means whereby the clutch of an automobile may be disengaged and at the same time the brakes applied without the necessity of employing the feet.

Another object is to produce a device of this character wherein the motor vehicle may be quickly and efficiently controlled in traffic from a point upon the steering wheel.

Another object of the present invention is to provide means which will accomplish the above objects without materially altering the construction of the standard form of motor vehicle, and without incurring an excessive cost.

A still further object is to produce a device of this character which will not detract from the appearance of the car upon which it is applied.

Other objects and advantages will be apparent during the course of the following description.

In the accompanying drawings forming a part of this specification, and in which like numerals are employed to designate like parts throughout the same, Figure I is a side elevation of my device as the same would appear when attached to an automobile, a portion of which is shown in cross-section, Figure II is a fragmentary top plan view of my device showing the pedal arrangement, and Figure III is a cross-section taken on the line III—III of Figure II, and Figure IV is a fragmentary detail view showing the brake lock.

At the present time in order to stop a vehicle in traffic it is necessary to depress the clutch pedal and also the brake pedal and to hold both depressed until it is again desired to start the car, that is, provided the gears are in mesh.

With my device it is possible to move a lever upon the steering wheel, which lever will apply the brakes, release the clutch and hold the same in this position until the driver is again ready to move upon the highway. Then by returning the lever to its normal position the brakes will be released and the clutch engaged with the result that the machine will start without using the feet to accomplish this result. It is also possible for my device to release only the clutch through the operation of the hand lever whereby gear may be changed.

This allows one of the feet to be placed upon the accelerator in order to speed up the machine as is required in most instances of this character.

In the accompanying drawings wherein for the purpose of illustration is shown a preferred embodiment of my invention, the numeral 5 designates the chassis of a motor vehicle having an engine 6, a dash board 7, an instrument board 8, hood 9, steering column 11 and steering wheel 12. The seat is shown at 13, all of which parts are standard upon any motor vehicle and form no part of my invention.

At 14 I have shown a clutch pedal and at 16 a brake pedal. These pedals are of the usual construction and are pivoted as at 17 and each connects to its respective control rods. One of the control rods is shown at 18.

Pivotally secured to the pedals 14 and 16 are connecting links 19 and 21, respectively. These links are in turn pivoted to a sliding yoke 22. This sliding yoke is slidable in a slot 23 formed in the end of a connecting rod 24. This connecting rod extends through a stuffing box 26 and is secured to a piston 27 carried in cylinder 28 which is connected to one of the cylinders of the engine 6. This connection may be made in any manner desired, here shown by a fitting 31 utilizing the spark plug opening into which fitting the spark plug 32 is secured. A check valve is also included in this fitting.

A valve is shown at 33 which valve has a rod 34 having an offset 36. A link 37 connects with the offset 36 and extends to an offset portion 38 of a rod 39 extending through the steering column 11 and being connected to a control lever 41 positioned upon the steering wheel 12. Secured to the bottom of the rod 39 is a brake lock consisting of an arm 42 having a segment 43 upon the edge of which is formed a lug 44 the purpose of which will be later seen.

The manner of using my device is as follows:—

Assuming that the device has been placed upon a vehicle and the operator wishes to stop, the control lever 41 is moved so as to open the valve 33 thus admitting pressure from the cylinder of the engine to the cylinder 28 which causes the piston 27 to move towards the left of the drawing of Figure I, with the result that a pull will be given to the yoke 21 which pull will be in turn transmitted to the links 19 and 21 and to the pedals 14 and 16, thus releasing the clutch and applying the brake.

Upon returning the control lever to normal position the pressure in the cylinder 28 will be relieved, at which time the pedals will return to their normal position and the vehicle will again be under way. If the operator wishes to employ either pedal, he may do so by depressing either one at which time the yoke 22 will move to either the dotted line position of Figure II through the fact that the yoke may slide within the slot 23 due to the formation of the yoke, the same will center itself whenever the piston 27 is operated. When the operator merely wishes to change gears, the lever 41 is moved to shift position which is half way between off position and brake position, with the result that the brake lock is so actuated that the segment 43 moves the lug 44 into a notch formed in the link 21. When in this position the valve 33 will open sufficient to actuate the clutch pedal thereby permitting the operator to change gears. In either the normal or braking position of the lever 41 the lug 44 is out of alignment with the link 21 thus leaving the same to function in the normal manner.

It will thus be seen that I have provided a very simple device which will accomplish all of the objects above set forth.

It is to be understood that the form of my invention herewith shown and described is to be taken as a preferred example of the same and that various changes relative to the shape, size, material and arrangement of parts may be resorted to without departing from the spirit of the invention, or the scope of the subjoined claims.

Having thus described my invention, I claim:—

1. In a device of the character described, in combination with a motor vehicle, of a cylinder having a piston movable therein, a connecting rod secured to said piston, said piston rod having a slot formed therein, a yoke slidable within said slot, links secured to said yokes and having their free ends connected to the brake pedal and the clutch pedal of said motor vehicle and means for actuating said piston in the manner described.

2. In a device of the character described, in combination with a motor vehicle, of a cylinder having a piston movable therein, a connecting rod secured to said piston, said piston rod having a slot formed therein, a yoke slidable within said slot, links secured to said yokes and having their free ends connected to the brake pedal and the clutch pedal of said motor vehicle, means for actuating said piston in the manner described, and means comprising a pipe extending from the engine of said motor vehicle to said piston, a valve positioned within said pipe and means for operating said valve at a point adjacent the steering wheel of said motor vehicle.

In testimony whereof I affix my signature.

THOMAS A. McINTYRE.